Jan. 23, 1968 D. FIRTH 3,364,698
FLEXIBLE COUPLING
Filed June 28, 1965 3 Sheets-Sheet 1

INVENTOR.
DAVID FIRTH
BY George A. Schwind
ATTY.

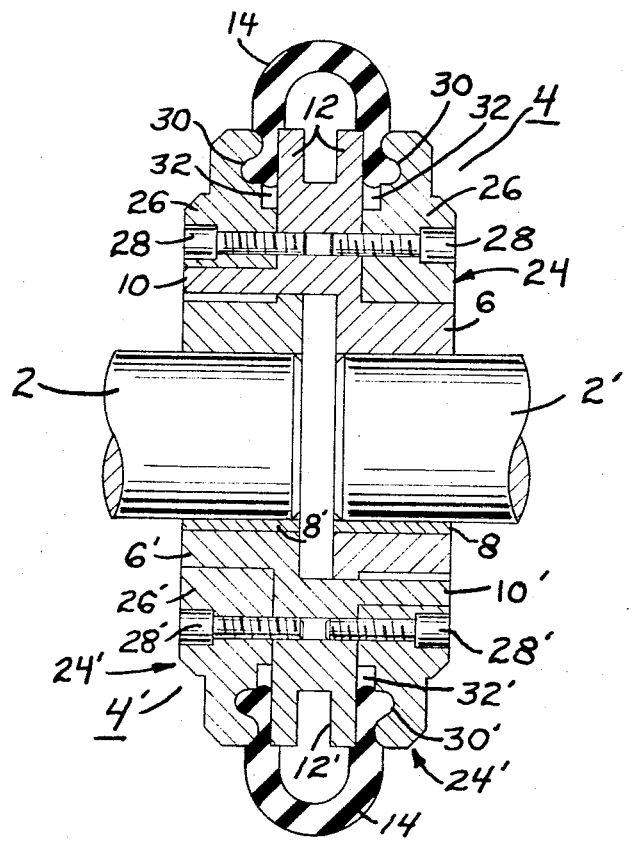
Fig 3
Fig 4
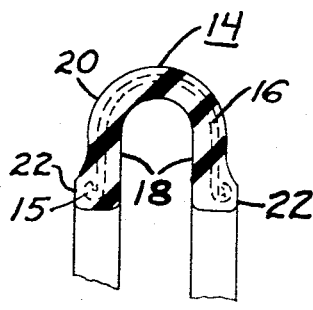
Fig 5
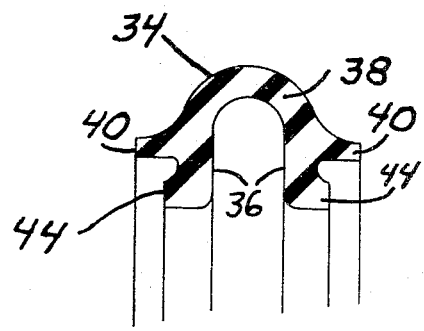

INVENTOR.
DAVID FIRTH

United States Patent Office 3,364,698
Patented Jan. 23, 1968

3,364,698
FLEXIBLE COUPLING
David Firth, 1441 E. Jefferson Blvd.,
South Bend, Ind. 46617
Filed June 28, 1965, Ser. No. 467,511
10 Claims. (Cl. 64—11)

This invention relates to couplings, and in particular to flexible couplings for connecting two rotatable, axially positioned shafts for the purpose of transmitting power from one shaft to another.

Flexible couplings of the torsionally resilient type, which utilize a non-metallic yielding or flexible element as the connecting means, normally are comprised of a pair of faced members which are joined together by the flexible connecting element. The flexible element is necessitated to compensate for shaft misalignment which may be caused by bearing wear, vibration, deflection of supporting structures and other contributing factors.

Numerous types of flexible elements have heretofore been utilized to connect the shafts of flexible coupling, including belts, ropes, tire-like flexible elements and others. The method of connecting the coupling elements varies from peripheral clamping means to multiple cross-lacing between the elements.

One of the problems heretofore present in flexible couplings utilizing a tire-like yielding element to join the coupling members together is that upon rotation of the coupling, centrifugal force will tend to outwardly expand the outer periphery of the yielding element and consequently the shafts of the coupling will be drawn together, causing undesirable end float and thrust loads on the bearings of the motors and machinery to which the coupling members are fastened. In such couplings, the members will resume normal spacing when the rotation of the coupling ceases. However, it is readily apparent that such end float of the coupling members is detrimental to the bearings and associated machinery.

Couplings utilizing a tire-like yielding element to connect the coupling members is shown by U.S. Patents No. 2,648,958 and 3,020,737, issued to K. Schlotmann and D. Firth, respectively, on Aug. 18, 1953 and Feb. 13, 1962, respectively. In these cited patents, the tire-like yielding element is the only means connecting the two coupling face members. The tire-like yielding elements utilized in these couplings are subjected to excessive torsional stresses during operation, and particularly when load changes occur. Such torsional stresses cause undue wear, fracture and subsequent deterioration of the flexible yielding element and necessitate additional cross supporting web in the construction of the element. Addition of such cross supporting web also increases the cost of the flexible element considerably. Any minimizing of torsional stresses in the flexible yielding element of the coupling will, therefore, be advantageous since the wear resistant qualities of the element will be increased. Further, the transmission of power from one coupling member to the other while the flexible member is primarily subjected to tensional stresses reduces the wear and fracture problems associated with torsional stresses, and also eliminates the necessity for cross supporting web in the flexible element.

This invention relates to an improved flexible coupling which utilizes a tire-like yielding element for connecting the coupling members. The coupling herein described is comprised of two similar members having projecting sections which dovetail into each other in spaced apart relationship and are connected to a common tire-like yielding element which is in tension during operation, for providing an effective and improved means of accommodating any shaft misalignment or end float which might be present in the coupling.

It is the primary object, therefore, of this invention to provide a flexible coupling which is capable of effectively withstanding flexing in all directions.

Another object of this invention is to provide a coupling which reduces thrust loads on bearings of associated equipment by eliminating thrust loads caused by centrifugal force, and, end float of the coupling members, by means of a novel construction and attachment of the flexible yielding element to the coupling members which substantially reduces the effects of centrifugal force on the said element at high speeds.

Still a further object is to provide a coupling wherein the centrifugal force created during operation of the coupling does not affect functioning or positioning of the flexible element which connects the coupling members.

Another object of this invention is to provide a flexible yielding element which is of tire-like configuration and wherein the element is in tension during normal operation.

Another object is to provide a coupling capable of withstanding and accommodating angular and parallel shaft misalignment and end float, when the latter is desirable.

Still another object of the present invention is to provide a coupling wherein torsional stresses on the flexible element are reduced to a minimum.

A further object is to provide a coupling wherein the reinforcing web of the flexible element is only necessitated in circumferential positioning and cross webbing is eliminated since torsional stresses in the flexible element are virtually eliminated.

Another object of this invention is to provide a coupling which utilizes a flexible element that encircles the entire outer periphery of the face members of the coupling to thereby serve as a protective and safeguard means when the coupling is revolving.

Still another object is to provide a flexible coupling having a flexible connecting member which is readily replaced without disturbing the shaft fixtures or associated machinery since access to the flexible element is by a side clamping means located on each coupling member.

Still another object of the instant invention is to provide a flexible coupling having complementary offset sectors which are separated from each other a predetermined distance during normal operation but which form a direct driving means between the coupling members in the event of failure of the flexible connecting element. This feature allows for operation of the coupling until repair of the flexible element is performed.

Another object is the use of identical, interchangeable, coupling members on both driving and driven shafts.

A further object is to provide a flexible coupling which is relatively simple in construction, more economical in replacement of flexible elements than heretofore afforded, and is easily serviced.

Still another object is to provide a coupling having a high load carrying capacity and readily adapted for a variety of uses due to its efficient design and operation.

These and other objects of the invention will become apparent from the following specification, which when taken in conjunction with the accompanying drawing, illustrates a preferred form of the invention.

In the drawings:

FIG. 3 is a cross-sectional view of the coupling taken on line 3—3 of FIG. 1;

FIGS. 4, 5 and 7 are cross-sectional views of various types of flexible elements utilized with the coupling herein described;

Figure 1:
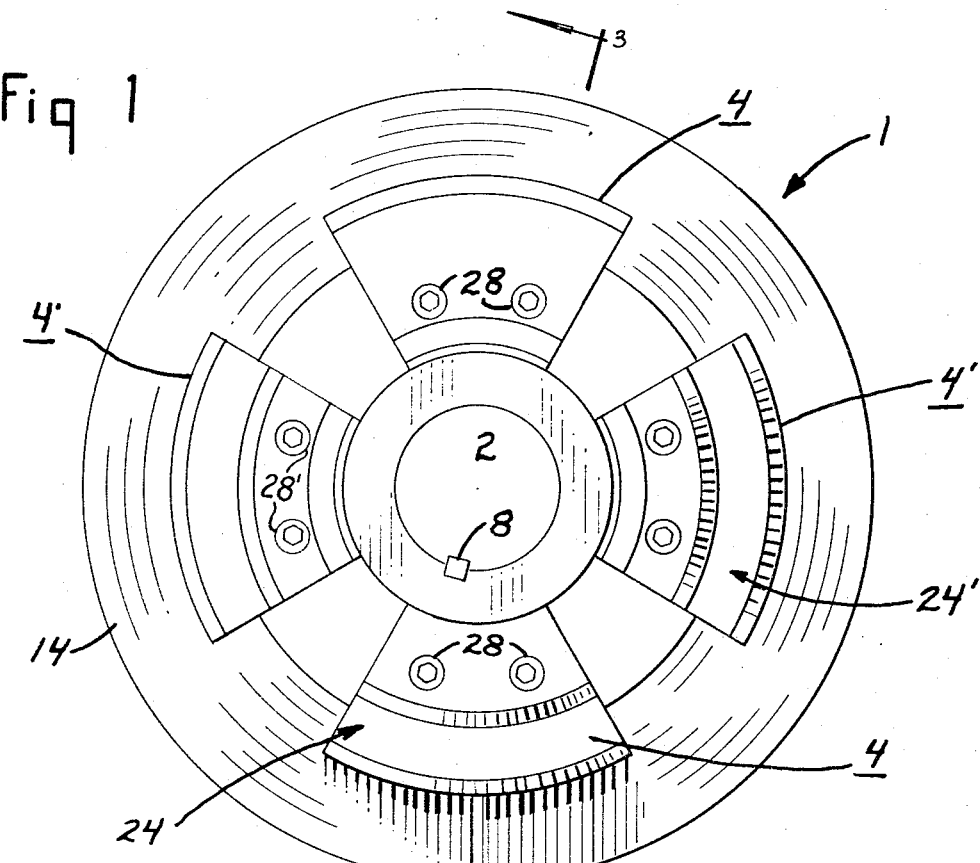
FIG. 1 is an elevational view of the flexible coupling.
Figure 2:
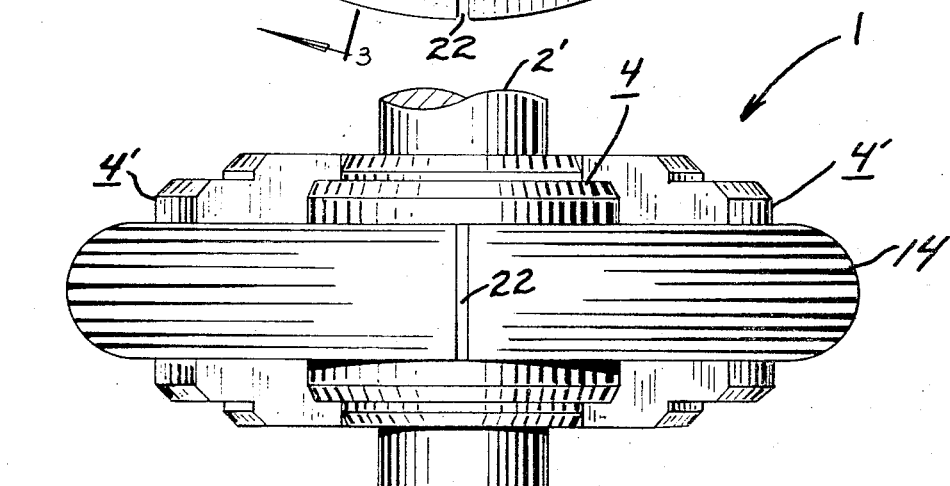
FIG. 2 is a plan view of the coupling shown in FIG. 1.

With reference to the drawing, and in particular to FIGS. 1–3, the flexible coupling, generally designated as 1, consists of two separate coupling members or assemblies 4 and 4', which are mounted on driving and driven shafts 2 and 2', respectively. The shafts 2, 2' are in substantial alignment with each other and are also spaced apart from each other in end to end relationship wherein the driving shaft 2 is normally attached to the motor or the like and the driven shaft 2' is affixed to the machine or device to be driven. Although shafts 2, 2' are shown as being of similar diameter, the diameters of the shafts may be varied to accommodate the particular installation requirements.

Since the coupling assemblies 4, 4' are identical in construction, and are obviously interchangeable and adapted to be utilized either on the driving or driven shafts, only one coupling member will be herein described in detail and like numerals will be used on like parts in the two coupling members, the distinction being only the use of primes to identify like parts of the other coupling member.

Coupling assembly 4 includes a hub 6 which is affixed to shaft 2' by any suitable, conventional means such as a key means 8 to prevent relative rotation between the said shaft and hub. Hub 6 has a plurality of equispaced sectors 10 which project and extend away from the respective shaft on which the said hub is mounted. A rim or mounting means 12 projects radially outwardly from hub 6 and is centrally located with respect to the vertical sides of assembly 4 so that the means 12 is symmetrically positioned in proximity to the ends of shafts 2, 2'. The mounting means 12 lie in a plane which is normal to the shaft to which the member 4 is affixed.

A flexible connecting element 14 of tire-like configuration is utilized to form a connection between the two coupling assemblies 4, 4'. FIG. 5 shows a cross-section of the flexible element 14 having reinforcing web 16 therein. Element 14 is substantially annular in shape and arcuate in cross-section and is formed by placing reinforcing web of nylon, rayon, or other suitable material, between layers of laminated rubber or similar elastic material, natural or synthetic, and vulcanizing the same in a mold in a conventional manner. The web is encircled at its extremities to form a loop 15. Since the flexible element is subjected to tensional stresses the reinforcing web is circumferentially positioned around the periphery of the element. The flexible element 14 consists of rim portions 18 which are integral with the arcuate portion 20 to form the tire-like configuration. Beads 22 extending axially outwardly from the terminal edges of rim portions 18 provide additional reinforcing means for the flexible element when the same is affixed to the coupling assemblies 4, 4, to be hereinafter explained. With reference to FIG. 1, it is noted that the flexible element 14 is slit at 22 to facilitate mounting of the said element on the mounting means 12.

With reference to FIG. 3, the rim portions 18 of flexible element 14 are adapted to straddle the mounting means 12 and 12' so that the said portions overlap the means 12 and 12', as clearly shown in FIG. 3. A clamping assembly or means 24, positioned on each of the respective sides of mounting means 12 on each sector 10, includes clamping sectors 26 which are of contour similar to the sectors 10 to which they are affixed. Each clamping sector 26 includes a plurality of screws 28 which pass through sector 26 and are threadedly engaged into mounting means 12, as shown, to thereby clamp the rim portions 18 of the flexible element 14 against the mounting means 12 to prevent slippage therebetween. On each clamping sector 26, in proximity to the mounting means 12, is an arcuate recess 30 which is adapted to accept the bead portion 22 of the flexible element to thereby increase the gripping capacity of the clamping sector 26 when the same is tightened against the mounting means 12. A recess 32, adjacent to recess 30 and in communication therewith, on each of the clamping sectors 26 is provided to accommodate the rim portions 18 of the flexible element 14, as shown.

Figure 6:
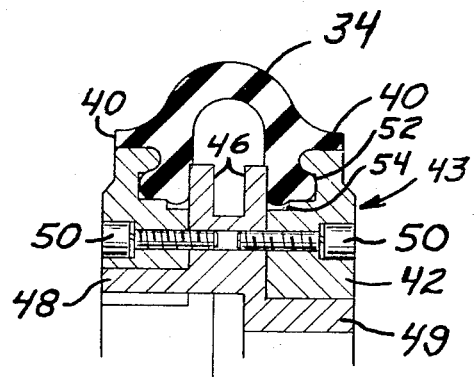
FIG. 6 is a partial cross-sectional view of the coupling utilizing a modified form of flexible element, as shown in FIG. 4, having extended flanges; and, FIG. 8 is a partial cross-sectional view of a sector of the coupling showing the use of another modified form of flexible element, as shown in FIG. 7, wherein the fastening screws for the element pass through the element.

With reference to FIGS. 4 and 6, a modified form of flexible element, generally identified by numeral 34, is shown, wherein rim portions 36 are integral with the arcuate portion 38 of the said element and wherein flange portions 40 extend axially outwardly and are positioned intermediate said arcuate and rim portions. Flange portions 40 are provided to overlap and thereby cover the outer periphery of the clamping sectors 42 (FIG. 6) of clamping assembly 43 with which they are associated. Such coverage of the outer periphery of the said sectors 42 by said flanges 40 provides a smooth, circumferential surface free of any obstructions to thereby provide a safeguard during operation of the coupling. Bead portions 44 on the rim portions 36 of the flexible element 34 are also provided for the purpose heretofore described with reference to FIGS. 1–3. With reference to FIG. 6, clamping sectors 42 are attached to mounting means 46 of the sectors 48, the latter of which project from hub 49, by screws 50, as clearly shown. Recess 52 accommodates the bead portion 44 of the flexible member 34 and recess 54 accommodates the rim portion, as heretofore explained re FIGS. 1–3. The flange portions 40 of flexible element 34 extend to the extremities of the periphery of the clamping sectors 42 to thereby provide a smooth continuous surface for the coupling.

Figure 7:
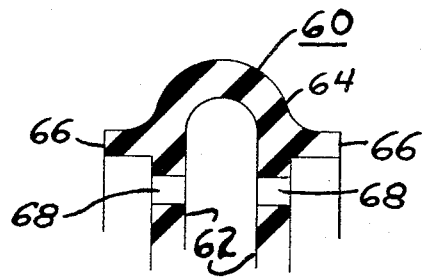
Figure 8:
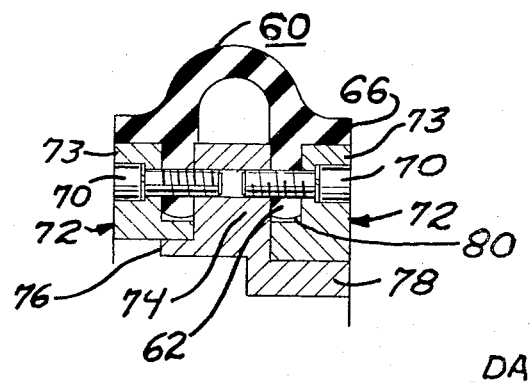

With reference to FIGS. 7 and 8, a further modified form of the coupling is shown wherein flexible element 60 includes rim portions 62 integral with an arcuate portion 64, and flange portions 66 extending therefrom in an axially outwardly direction to cover the clamping sectors 73 with which they are associated. Holes 68 are provided in each rim portion 62 to enable the screws 70 of clamping assembly or means 72 to pass through the flexible element 60 and sector 73 and become threadedly engaged into mounting means 74. Flange portions 66 extend axially from the flexible element to thereby cover the clamping assembly's outer periphery.

To perform properly, the coupling must be prepared for operation so that the members 4, 4' and flexible element 14 are properly prepositioned. To prepare the coupling for operation on horizontally positioned shafts in end to end relationship, and with reference to FIG. 3, the coupling members 4, 4' are secured to their respective shafts so that sectors 10, 10' dovetail into each other at equidistant intervals and are not in touching relationship with each other. The sectors 10, 10' are prepositioned so that the mounting means 12, 12' are in circumferential alignment. It is noted that the mounting means should be axially positioned so that it is equidistant from the ends of the horizontally aligned shafts 2, 2'. The sectors 10, 10', are identical and hence the dovetailing of them will be a symmetrical arrangement. When means 12, 12' are aligned, the rim portions 18 of the flexible, tire-like element 14 are placed over the projecting means, and, the clamping assembly 24, 24' is positioned so that the bead portions 22 are confined in the recesses 30, 30' of the said clamping assemblies. The rim portions will then fall into their respective, annular, recesses. When the flexible element is positioned, the screws 28, 28' are then tightened on all sectors 10, 10' until the flexible element 14 is secured between the mounting means and the clamping assemblies. The coupling is then ready for operation. The slit 22 in flexible element 14 enables convenient placement and replacement of the said element on the mounting means 12, 12' without removal of the coupling members from the shafts 2, 2' on which they are affixed. It is also noted that the slit 22 should be positioned so that the respective ends of the flexible element 14 are clamped in one of the sectors 10, 10'. With reference to FIGS. 1 and 2, it is specifically noted that subsequent to the clamping of the flexible member to the sectors, a flexible coupling is formed between the two members 4, 4'. Also, upon operation of the coupling, regardless which way the coupling is rotated, the affixing of the flexible element is such, being on the outer periphery and also because of the fact that it is affixed to the dovetailed sectors, the sectors pull each other via the flexible element thereby maintaining tension in the element at all times. Obviously, if sectors 10, 10' abutted each other, the flexible element would not be in tension and hence it is readily apparent that the prepositioning of the sectors so that they are spaced from each other is of prime importance for proper operation of the coupling.

Although the above disclosure is identified with a tire-like flexible element for use in coupling the two members of the coupling together, it will be obvious to one skilled in the art that other similar configurations or other flexible like material of various fabrics could be utilized without departing from the scope of the present invention. It is also evident that although there are four sectors shown in the drawings and disclosed herein, various other multiples of sectors could be utilized in accordance with the foregoing disclosure without departing therefrom. It is further evident that flexible couplings made in accordance with the foregoing description will perform in conformance with the objects herein set forth to provide a coupling of improved performance which reduces the effect of end float and bearing wear caused by centrifugal force acting on the flexible element.

I claim:

1. A flexible coupling comprising:
   (a) a plurality of like coupling members adapted to be mounted on the ends of axially aligned shafts;
   (b) a plurality of offset sectors on said members directed toward and positioned between each other;
   (c) rim means projecting radially from the periphery of each of said sectors, said means being in circumferential alignment with each other in a plane normal to the axially aligned shafts;
   (d) an annular flexible element comprising; an arcuate portion, rim portions integral with said arcuate portion, a bead projecting axially outwardly from each of said rim portions, said rim portions positioned to overlap said rim means; and
   (e) clamping means adapted to secure said rim portions to said rim means including a clamping sector positioned on each side of said rim means, said sector having an arcuate recess therein adapted to accept said bead and whereby said element is in tension between said sectors.

2. A flexible coupling comprising:
   (a) a purality of like coupling members adapted to be mounted on the ends of axially aligned shafts;
   (b) a plurality of offset sectors on said members directed toward and positioned between each other;
   (c) rim means projecting radially from the periphery of each of said sectors, said means being in circumferential alignment with each other in a plane normal to and in equidistant proximity to the ends of the axially aligned shafts;
   (d) an annular flexible element comprising an arcuate portion, rim portions integral with said arcuate portion, a flange extending from each rim portion adapted to cover a clamping sector, a bead projecting axially outwardly from each of said rim portions, said rim portions positioned to overlap said rim means; and,
   (e) clamping means adapted to secure said rim portions to said rim means including a clamping sector positioned on each side of said rim means, said sector having an arcuate recess therein adapted to accept said bead, and, means to secure each said clamping sector to said rim means.

3. A flexible coupling comprising:
   (a) a plurality of like coupling members adapted to be mounted on the ends of axially aligned shafts;
   (b) a plurality of offset sectors on said members directed toward each other and positioned to dovetail into each other;
   (c) rim means projecting radially from the periphery of each of said sectors intermediate thereof, said means being in circumferential alignment with other sectors in a plane normal to the axially aligned shafts and positioned equidistant therefrom;
   (d) an annular flexible element of tire-like configuration having rim portions adapted to straddle said rim means and encircle said members to form a connection therebetween, flanges extending axially outwardly from said rim portions; and,
   (e) clamping means adapted to secure said rim portions to said rim means wherein said flanges overlay the outer periphery of said clamping means to provide a smooth periphery.

4. A flexible coupling comprising:
   (a) a plurality of like coupling members adapted to be mounted on the ends of axially aligned shafts;
   (b) a plurality of offset sectors on said members directed toward each other and positioned to dovetail into each other;
   (c) rim means projecting radially from the periphery of each of said sectors intermediate thereof, said means being in circumferential alignment with other sectors in a plane normal to the axially aligned shafts and positioned equidistant therefrom;
   (d) an annular flexible element of tire-like configuration having rim portions adapted to straddle said rim means and encircle said members to form a connection therebetween, flanges extending axially outwardly from said rim portions, a bead on the extremity of each said rim portions; and,
   (e) clamping means adapted to secure said flexible element to said rim means including clamping sectors positioned on each side of said rim means, each of said clamping sectors having an arcuate recess therein adapted to accept said bead, a plurality of fasteners passing through said clamping sectors and flexible element threadedly engaged in said rim means.

5. A flexible coupling comprising:
   (a) a plurality of like coupling members adapted to be mounted on the ends of axially aligned shafts;
   (b) a plurality of offset sectors on said members directed toward each other and positioned to dovetail into each other;
   (c) rim means projecting radially from the periphery of each of said sectors intermediate thereof, said means being in circumferential alignment with other sectors in a plane normal to the axially aligned shafts and positioned equidistant therefrom;
   (d) an annular flexible element of tire-like configuration having rim portions adapted to straddle said rim means and encircle said members to form a connection therebetween, flanges extending axially outwardly from said rim portions, a bead on the extremity of each said rim portions; and,
   (e) clamping means adapted to secure said flexible element to said rim means including; a clamping sector positioned on each side of said rim means, each clamping sector having a first recess adjacent said rim means adapted to receive a rim portion and a second recess in communication with said first recess adapted to receive said bead, and, means to secure said element and clamping sectors to said rim means.

6. A flexible coupling for connecting two axially positioned shafts in end to end relation comprising:
   (a) a first member adapted to be secured to a shaft;
   (b) a second member similar to said first member and adapted to be secured to a second shaft;
   (c) means to secure said members to said shafts;
   (d) a plurality of offset sectors on each of said members adapted to dovetail into each other;
   (e) rim means projecting radially from the periphery of said sectors, said means being in circumferential alignment with each other in a plane normal to the axially positioned shafts;

(f) a flexible tire-like element having rim portions adapted to overlie said rim means, an annular bead projecting axially outwardly from said rim portions; and, (g) clamping means adapted to secure said rim portions to said rim means including; a clamping sector positioned on each side of said rim means adapted to engage said rim portions, said clamping sectors having an arcuate recess therein adapted to accept said annular bead, means to tighten said clamping sector to said rim means to thereby prevent relative movement.

7. A flexible coupling for connecting two axially positioned shafts in end to end relation comprising:
(a) a first member adapted to be secured to a shaft;
(b) a second member similar to said first member and adapted to be secured to a second shaft;
(c) means to secure said members to their respective shafts;
(d) a plurality of offset sectors on each of said members directed toward each other and adapted to dovetail into each other;
(e) rim means projecting radially from the periphery of said sectors, said means being in circumferential alignment with each other in a plane normal to the axially positioned shafts;
(f) a flexible tire-like element having rim portions adapted to straddle said rim means, an annular bead projecting axially outwardly from each of the rim portions, a flange projecting from each of the rim portions; and,
(g) clamping means adapted to secure the rim portions of said rim means and wherein said flanges overlay the outer periphery of said clamping means to provide a smooth periphery.

8. A flexible coupling for connecting two axially positioned shafts in end to end relation comprising:
(a) a first member adapted to be secured to a shaft;
(b) a second member similar to said first member and adapted to be secured to a second shaft;
(c) means to secure said members to their respective shafts;
(d) a plurality of offset sectors on each of said members directed toward each other and adapted to dovetail into each other;
(e) rim means projecting radially from the periphery of said sectors, said means being in circumferential alignment with each other in a plane normal to and in equidistant proximity to the ends of the axially positioned shafts;
(f) an annular flexible element comprising an arcuate portion, rim portions integral with said arcuate portion adapted to straddle said rim means, an annular flange extending from each said rim portion adapted to cover the outer periphery of a clamping sector, an annular bead projecting axially outwardly from each of said rim portions; and,
(g) clamping means adapted to secure said rim portions to said rim means including, a clamping sector positioned on each side of said rim means, said sector having an arcuate recess therein adapted to accept said annular bead.

9. A flexible coupling for connecting two axially positioned shafts in end to end relation comprising:
(a) a first member adapted to be secured to a shaft;
(b) a second member similar to said first member and adapted to be secured to a second shaft;
(c) means to secure said members to their respective shafts;
(d) a plurality of offset sectors on each of said members directed toward each other and adapted to dovetail into each other;
(e) rim means projecting radially from the periphery of said sectors, said means being in circumferential alignment with each other in a plane normal to the axially positioned shafts;
(f) an annular flexible element comprising an arcuate portion, rim portions integral with said arcuate portion adapted to straddle said rim means, an annular flange extending from each said rim portion adapted to cover the outer periphery of a clamping sector, an annular bead projecting axially outwardly from each of said rim portions; and,
(g) clamping means adapted to secure said rim portions to said rim means including; a clamping sector positioned on each side of said rim means, said sector having a first arcuate recess adapted to accept said rim portions, a second arcuate recess in communication with the first recess adapted to accept said annular bead, a plurality of fasteners threadedly engaged in said rim means adapted to clamp said element between said clamping sectors and said rim means.

10. A flexible coupling for connecting two axially positioned shafts in end to end relation comprising:
(a) a first member adapted to be secured to a shaft;
(b) a second member similar to said first member and adapted to be secured to a second shaft;
(c) means to secure said members to their respective shafts;
(d) a plurality of offset sectors on each of said members directed toward each other and adapted to dovetail into each other;
(e) rim means projecting radially from the periphery of said sectors, said means being in circumferential alignment with each other in a plane normal to and equidistant from the ends of the axially positioned shafts;
(f) an annular flexible element comprising an arcuate portion, rim portions integral with said arcuate portion adapted to straddle said rim means, an annular flange extending from each said rim portion adapted to cover the outer periphery of a clamping sector, an annular bead projecting axially outwardly from each of said rim portions, said element having circumferential reinforcing; and,
(g) clamping means adapted to secure said rim portions to said rim means including a clamping sector positioned on each side of said rim means, said sector having an arcuate recess therein adapted to accept said annular bead, a plurality of fasteners threadedly engaged in said rim means, said fasteners passing through said clamping sectors and said element and adapted to clamp the latter between said clamping sectors and said rim means.

References Cited

UNITED STATES PATENTS

| 1,302,248 | 4/1919 | Ungar | 64—13 |
| 1,500,959 | 7/1924 | Powers | 64—13 |
| 2,648,958 | 8/1953 | Schlotmann | 64—13 |
| 2,740,271 | 4/1956 | Beler | 64—11 |

FOREIGN PATENTS 1,248,272  10/1960  France.

HALL C. COE, *Primary Examiner.*